United States Patent
Takano

[11] Patent Number: 6,055,549
[45] Date of Patent: Apr. 25, 2000

[54] METHOD AND APPARATUS FOR PROCESSING A TABLE

[75] Inventor: Katsuji Takano, Musashimurayama, Japan

[73] Assignee: Casio Computer Co., Ltd., Tokyo, Japan

[21] Appl. No.: 08/860,677

[22] PCT Filed: Oct. 21, 1996

[86] PCT No.: PCT/JP96/03039

§ 371 Date: Jun. 13, 1997

§ 102(e) Date: Jun. 13, 1997

[87] PCT Pub. No.: WO97/15892

PCT Pub. Date: May 1, 1997

[30] Foreign Application Priority Data

Oct. 26, 1995 [JP] Japan .................................. 7-303571

[51] Int. Cl.[7] .................................................. G06F 17/21
[52] U.S. Cl. ........................................ 707/503; 707/520
[58] Field of Search ............................... 707/503, 3, 520, 707/509; 345/353, 346, 326, 473

[56] References Cited

U.S. PATENT DOCUMENTS

| | | | |
|---|---|---|---|
| 5,093,907 | 3/1992 | Hwong et al. ........................ | 345/473 |
| 5,479,603 | 12/1995 | Stone et al. ........................... | 345/326 |
| 5,623,591 | 4/1997 | Cseri ..................................... | 707/503 |
| 5,652,851 | 7/1997 | Stone et al. ........................... | 345/346 |
| 5,729,730 | 3/1998 | Wlaschin et al. ...................... | 707/3 |

OTHER PUBLICATIONS

Cowart, Robert. Mastering Windows(TM) 3.1: Special Edition. (San Francisco: SYBEX, 1993) pp. 380–382, Jan. 1, 1993.

Evans, David. Marketing Computers. vol. 14, No. 11, p. 22 (Dec. 1994) pp. 1–14, Dec. 1, 1994.

Stone, David M. and Brian Booher. Marketing Computers. vol. 4, No. 2, p. 286 (Feb. 1993) pp. 1–2, Feb. 1, 1993.

M. Levoy; "Spreadsheets for Images"; 1994; pp. 139–146; Computer Graphics Proceedings Annual Conference Series.

A.F. Hasler et al; A High Performance Interactive Image Spreadsheet (IISS); May/Jun. 1994; pp. 325–342; Computers In Physics, vol. 8, No. 3.

IBM Technical Disclosure Bulletin, vol. 32, No. 10B, Mar. 1990 "Scattering and Gathering Data Among Presentation Spaces"; pp. 24–27.

*Primary Examiner*—James P. Trammell
*Assistant Examiner*—John Leonard Young
*Attorney, Agent, or Firm*—Frishauf, Holtz, Goodman, Langer & Chick, P.C.

[57] ABSTRACT

A method and apparatus for processing a table, in which image data is stored as cell data of table data, so that an operation and procedure for processing the image data as cell data (e.g., an image process of the image data or an output of the image data to a designated cell) can be simple. In a table data output process, it is discriminated whether the type of a designated cell is numerical, character, image or sound data, and the corresponding data is read from a table data file, an image file or a sound file in accordance with the discriminated cell type. The read data is then output to an output region of the designated cell.

10 Claims, 11 Drawing Sheets

FIG.5

| HEADER INFORMATION | | | | | IMAGE SUBSTANCE |
|---|---|---|---|---|---|
| X | Y | RESOLUTION | PLACEMENT | · · · | |

FIG.9A REVERSAL 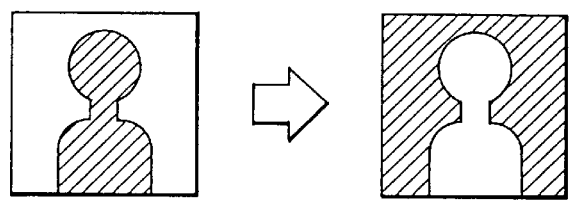
FIG.9B MIRRORING 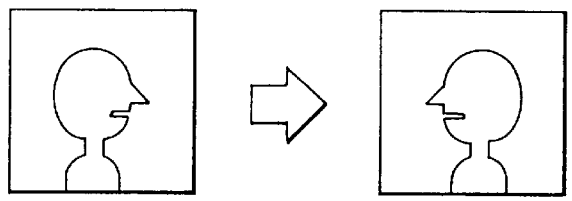
FIG.9C ENCLOSURE 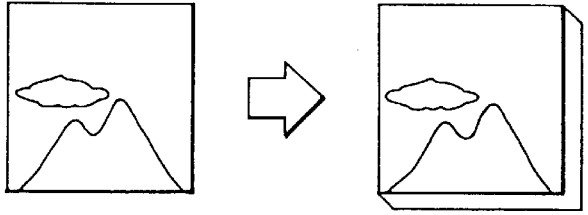

METHOD AND APPARATUS FOR PROCESSING A TABLE

TECHNICAL FIELD

The present invention relates to a method and apparatus for processing a table in units of cells which constitute the table, and more particularly to a method and apparatus for processing a table which enables image data processing in units of cells in a data processing apparatus.

BACKGROUND ART

In a conventional table processing apparatus incorporated in a computer system or the like, which has a function of forming a table in units of cells, the types of data input to the cells constituting the table are limited to two: numerical and character data. If numerical or character data (cell data) is to be mixed with another type of data (e.g., image or sound data) in the table, the latter type of data is expressed in a data structure and is managed by a managing method which are different from those of the cell data.

For example, an operation of editing normal cell data is restricted within cell frames. On the other hand, in the case of expressing image data in a table, an arbitrary region irrespective of cell frames is set as an image data frame, and an operation of pasting desired image data in the image data frame is required. In this case, the image data frame and the image data are processed by the data structure and managed by the managing method which are different from those for processing numerical and character cell data of the table.

The conventional table processing apparatus described above has the following drawbacks. To incorporate data other than numerical or character data (e.g., image or sound data) in a table, the data must be is processed by the data structure and managed by the managing method which are different from those for processing numerical and character cell data. Therefore, for example, to edit cell data when image data or sound data is incorporated in the table, it is difficult for the user to understand an operation for the above purpose due to the difference between the operations for processing the numerical or character data and image or sound data, and the operation procedures are complicated.

Thus, the operation of treating image data and sound data in the tabling process is complex, resulting in low operability of the table processing apparatus.

DISCLOSURE OF INVENTION

An object of the present invention is to provide a method and apparatus for processing a table, in which image data is stored as cell data of table data, so that an operation and procedure for processing the image data as cell data (e.g., an image process of the image data or an output of the image data to a designated cell of the table) can be simple and the manner of expressing cell data can be diversified.

According to the present invention, there is provided a method for processing table data in a form of a table consisting of a plurality of cells, the method comprising the steps of storing data including image data in a storing device so as to respectively correspond to cells of the table data; discriminating whether data in a designated cell of the table data to be processed is numerical data, character data or image data; if the data in the designated cell is discriminated as image data, producing an image based on the image data stored in the storing device in correspondence with the designated cell; and outputting the produced image to an output region of the designated cell.

BRIEF DESCRIPTION OF DRAWINGS

FIG. 5 is a diagram showing the structure of image data stored in the input data region shown in FIG. 2 by the image definition process shown in FIG. 3;

FIGS. 9A to 9C are diagrams showing examples of images modified by modification information of the cell attribute shown in FIG. 8;

BEST MODE OF CARRYING OUT THE INVENTION

First Embodiment

A first embodiment of the present invention will be described with reference to FIGS. 1 to 7.

First, the structure of the embodiment will be described.

Figure 1:
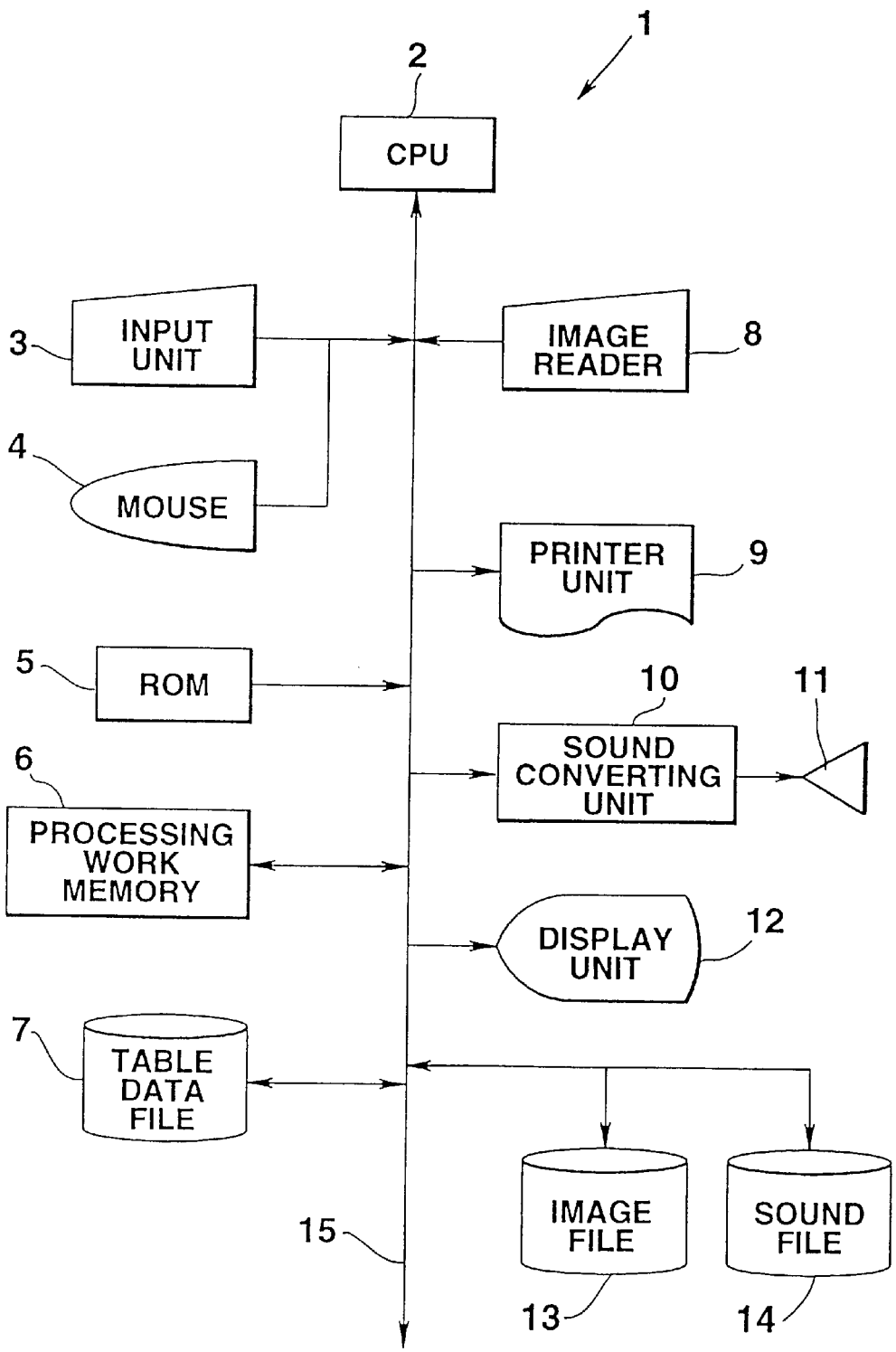
FIG. 1 is a block diagram of a computer system according to a first embodiment of the present invention.

FIG. 1 is a block diagram of a computer system 1 according to the first embodiment.

As shown in FIG. 1, the computer system 1 comprises a CPU (Central Processing Unit) 2, an input unit 3, a mouse 4, a ROM 5, a processing work memory 6, a table data file 7, an image reader 8, a printer unit 9, a sound converting unit 10, a loud speaker 11, a display unit 12, an image file 13 and a sound file 14. These components are connected to a bus 15.

The CPU 2 controls the components of the computer system 1 and executes various information processes in accordance with control programs stored in the ROM 5. When executing a tabling process, the CPU 2 causes items, numeric values and formula input via the input unit 3 and the mouse 4 to be stored in the table data file 7 through table calculation processes. When executing a table data output process (to be described later), the CPU 2 discriminates the cell type of a designated cell of the table; i.e., whether the cell stores numerical data, character data, image data or sound data. In accordance with the discriminated cell type, the CPU 2 reads the corresponding data from the table data file 7, the image file 13 or the sound file 14 and outputs the read data to the output region of the display unit 12, which corresponds to the designated cell of the table.

When executing a table definition process (to be described later), the CPU 2 causes the display unit 12 to display a sub-window for image definition, so that the name of the image file corresponding to the cell, subjected to image definition, can be designated. Then, the CPU 12 reads the image data corresponding to the designated image file name from the image file 13 to perform an image data editing process, and outputs the edited image to the output region of the designated cell so as to display it in the table. The image data defined by the image definition in the designated cell is stored in an input data region of the cell data shown in FIG. 2 in the form of the data structure to be described later.

The input unit 3 comprises function keys, numeric keys, character keys and others. It outputs to the CPU 2 various instruction signals corresponding to key input operations of the user.

The mouse 4 is a pointing device to perform operations supplementary to the input through the input unit 3. It outputs operation signals to the CPU 2.

The ROM 5 stores various control programs executed by the CPU 2, a table data output processing program and an image definition processing program.

The processing work memory 6 forms a memory region for editing image data output from the image file 13 when the CPU 2 executes the table data output process.

Figure 2:
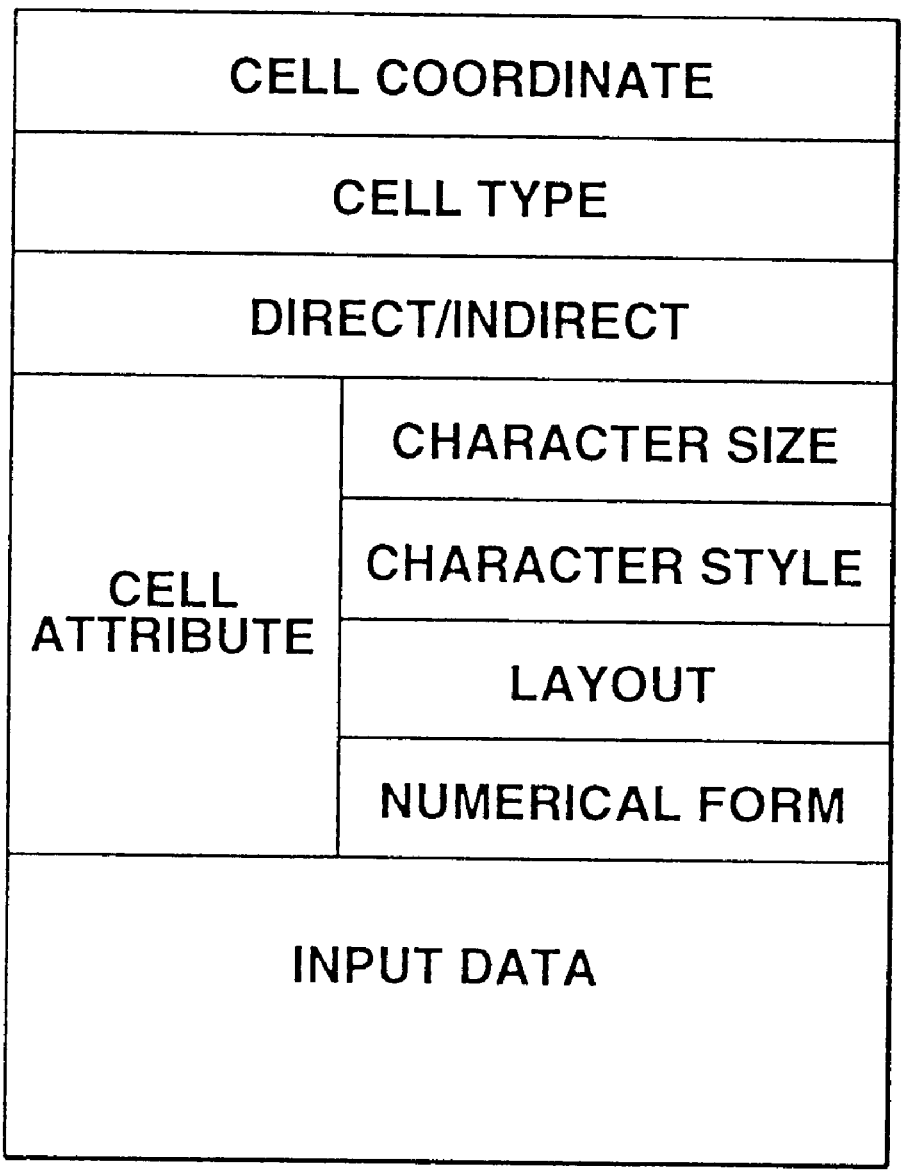
FIG. 2 is a diagram showing a data structure of cell data stored in the table data file shown in FIG. 1.

The table data file 7, to which numerical, character or image data is input, stores table data constituted by a plurality of cell data processed by the CPU 2. The data structure of the stored cell data is shown in FIG. 2. Referring to FIG. 2, the cell data is constructed by regions for storing cell position coordinate data (two dimensional coordinates (X, Y)) representing the position of a cell in the table; cell type data representing the type of cell data (e.g., 0: numerical data, 1: character data, 2: image data, 3: sound data); "direct" or "indirect" data; cell attribute data; and real data, i.e., input numerical, character, image, or sound data. The data "direct" means that the image or sound data is stored in the input data region as cell data, whereas the data "indirect" means that the image or sound data is stored in the image file 13 or the sound file 14. The cell attribute data include character size data (e.g., 0: 8 point, 1: 10 point), character style data (e.g., 0: Ming-style, 1: Gothic style), layout data (e.g., 0: left-justification, 1: centering, 2: right-justification), and numerical form data (0: standard, 1: 3-digit punctuation).

The image reader 8 scans a set original to be read, reads an image thereon with a predetermined resolution, and stores the read image in the image file 13 as image data.

The printer unit 9 prints table data output through the table output process executed by the CPU 2 on a preset paper sheet.

The sound converting unit 10 converts, into a sound signal, sound data which is output as a result of the table data output process executed by the CPU 2, when the content of the cell data in the designated cell is sound data. It outputs the sound signal through the loud speaker 11.

The display unit 12, comprising a CRT (Cathode Ray Tube), displays key input data input via the CPU 2 and developed table data.

The image file 13 is a memory which stores a plurality of image data read by the image reader 8. The sound file 14 stores a plurality of sound data to be output to cells.

An operation of the first embodiment will now be described.

First, an image definition process executed by the computer system 1 will be described with reference to the flowchart shown in FIG. 3.

Figure 3:
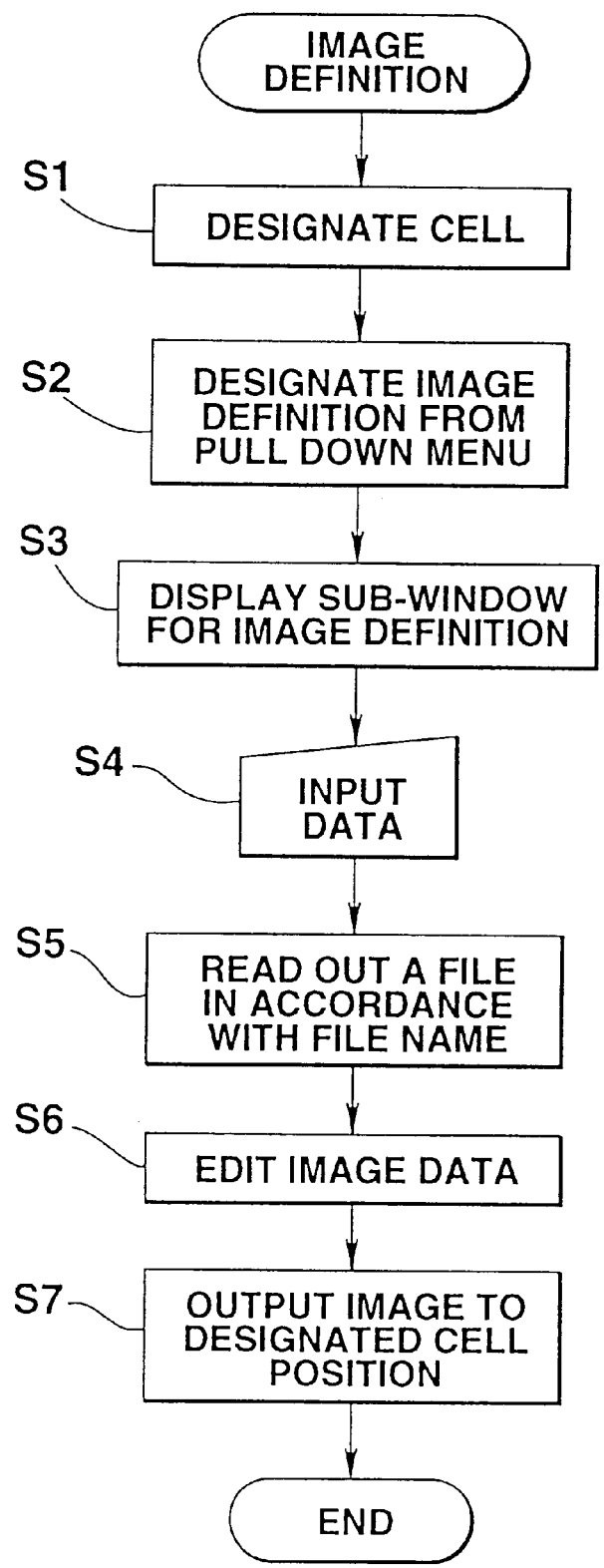
FIG. 3 is a flowchart of an image definition process executed by the computer system of the first embodiment.
Figure 4A:
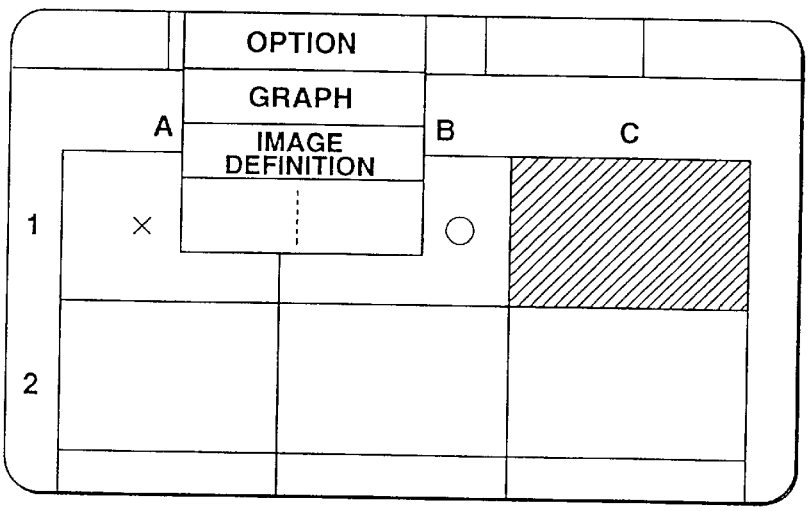
FIGS. 4A to 4C are diagrams showing image definition input screens displayed on the display through the image definition process shown in FIG. 3.
Figure 4B:
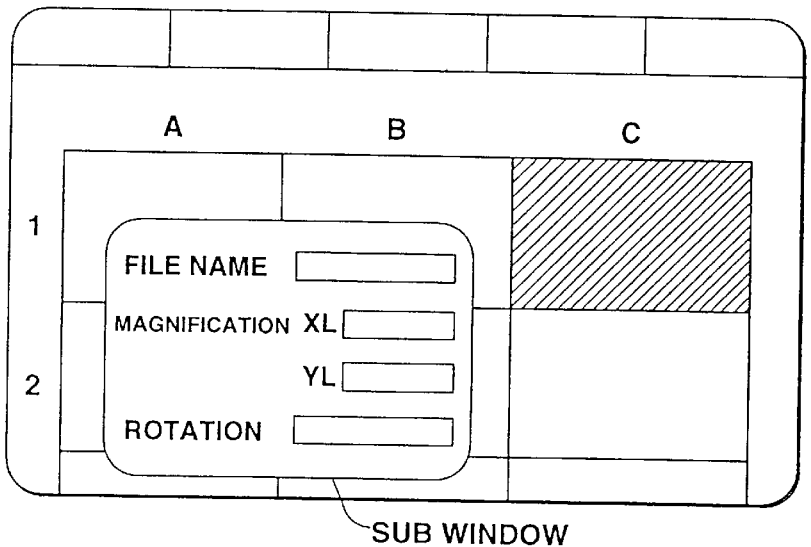
Figure 4C:
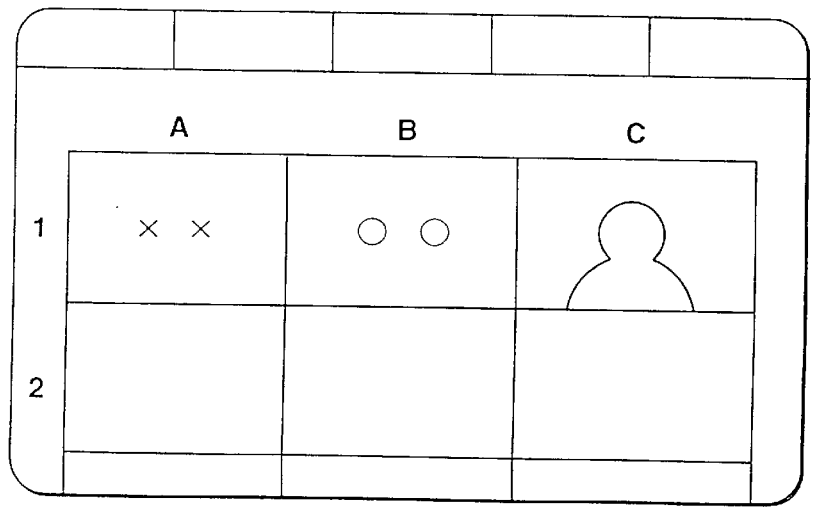

In the image definition process shown in FIG. 3, when an image definition object cell (in this embodiment, cell coordinates C3) is designated in table data displayed on the display screen of the display unit 12 by a predetermined operation of the input unit 3 or the mouse 4 (Step S1), a pull down menu including the item "Image Definition" is displayed on the table data as shown in FIG. 4A. When the item "image definition" is selected from the pull down menu (Step S2), a sub-window for image definition is superimposed on the table data as shown in FIG. 4B (Step S3).

The sub-window for image definition includes definition items, such as "File Name", "Magnification" (XL, YL), and "Rotation", which should be input by the user. By the item "File Name", the name of an image data file stored in the image file 13 is designated. By the item "Magnification", a display magnification of an image to be output in the output region of the designated cell position is designated in the X (horizontal) and Y (vertical) directions. By the item "Rotation", placement (e.g., an rotation angle of 90°) of the image to be output in the output region of the designated cell position is designated.

When definition items are input in the sub-window for image definition (Step S4), the image data corresponding to the input file name is read from the image file 13 into the processing work memory 6 (Step S5). The read image data is edited in accordance with the definition items of magnification and the rotation input in Step S4 (Step S6).

Subsequently, the edited image is output from the processing work memory 6 to the designated cell position, and the image is displayed in the output region of the designated cell C3 of the table data displayed on the display unit 12 (Step S7). Thus, the process is completed.

The image data displayed in the designated cell has the data structure as shown in FIG. 5. It is stored in the input data region of the cell data, as shown in FIG. 2, which corresponds to the designated cell C3 of the table data file 7. Referring to FIG. 5, the image data is constituted by a header information portion and an image substance portion. The header information portion stores control data necessary to display the image, such as the number of dots (size) in the X and Y directions, the resolution and the placement, as defined in Step S4. The image substance portion stores real data of the image data edited in Step S6.

Figure 6:
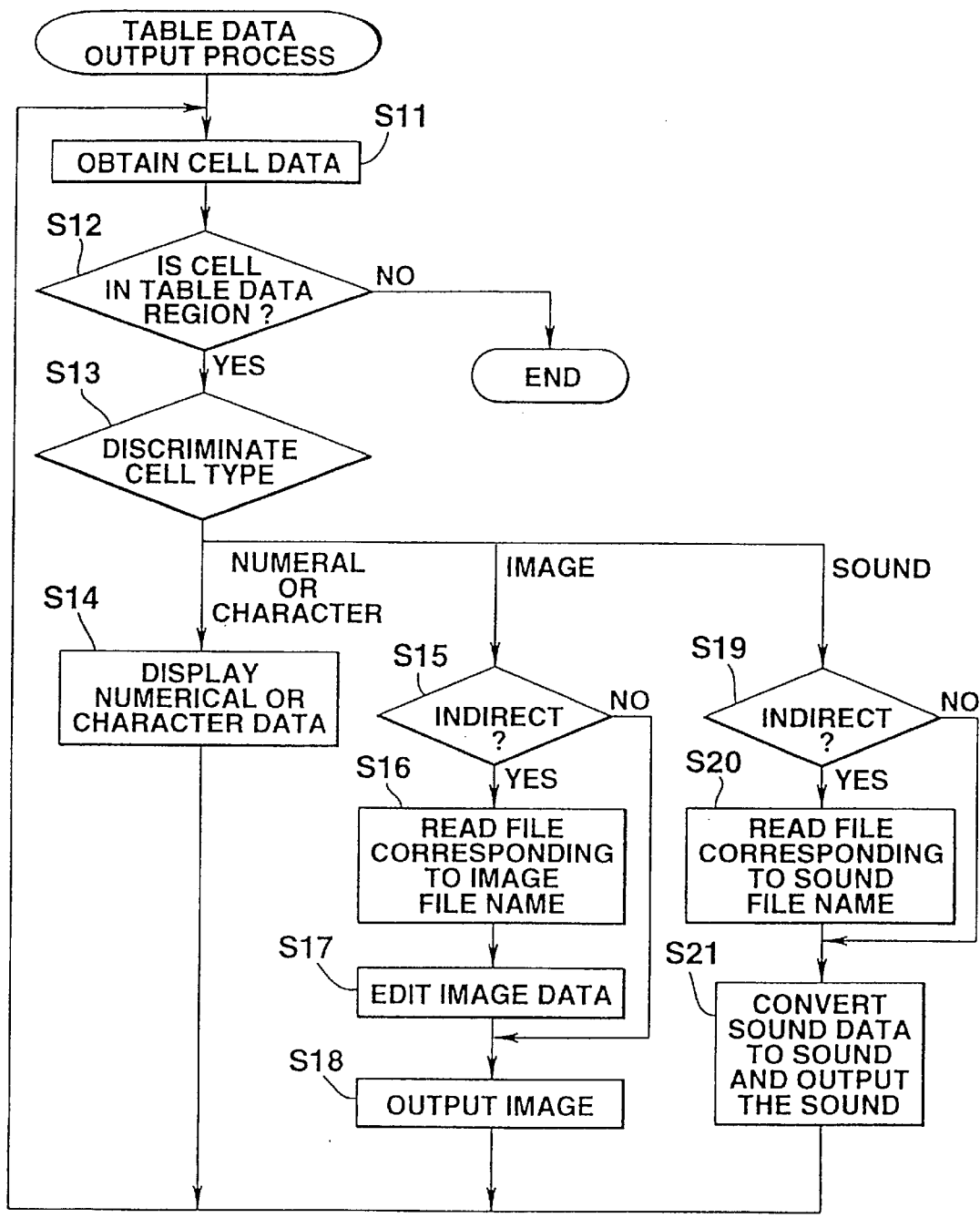
FIG. 6 is a flowchart showing a table data output process executed by the computer system of the first embodiment.

A table data output process executed by the computer system 1 will be described with reference to the flowchart shown in FIG. 6.

First, when the name of a file of the table data displayed on the display unit 12 is designated by a predetermined operation of the input unit 3 or the mouse 4, the table data corresponding to the designated file name is retrieved from the table data file 7. Cell data of each of the cells constituting the retrieved table data is obtained (Step S11). Then, it is determined, with reference to the cell position coordinates of the obtained cell data, whether the cell is included in a preset table data cell region (Step S12).

As a result of the determination, if the cell is not included in the predetermined table data cell region, the process is ended. If the cell is included in the predetermined table data cell region, the type of the data stored in the input data region of the cell data discriminated (whether the data is of numerical, character, image, or sound type) with reference to the cell type data set in the cell data (Step S13). If the cell type is discriminated as the numerical or character type, the numerical or character data stored in the input data region of the cell data is read out and displayed on the designated cell (Step S14). Then, the process returns to Step S11.

If the cell is discriminated as the image type, it is determined whether the image data is indirect or not with reference to the data "direct/indirect" (Step S15). If the image data is direct data, i.e., if the image data is stored in the input data region, it is read out from the input data region, and output to the output region of the designated cell in accordance with the header information of the image data (the display magnification in the X and Y directions, the resolution, and the placement) (Step S18). The process then returns to Step S11.

If the image data is indirect data, i.e., if the image data is not stored in the input data region, the image data corresponding to the image file name stored in the input data region is read out from the image file 13 into the processing work memory 6 (Step S16). The read image data is edited in accordance with the image definition designated in Step S4 (Step S17). The edited image data is output to the output region of the designated cell and displayed (Step S18). The process then returns to Step S11.

If the cell is discriminated as the sound type in Step S13, it is determined whether the sound data is indirect or not with reference to the data "direct/indirect" (Step S19). If the sound data is direct data, i.e., if the sound data is stored in the input data region, it is read out from the input data region, and output to the sound converting unit 10. The sound data is converted to a sound, which is output through the loud speaker 11 (Step S21). Then, the process returns to Step S11.

If the sound data is indirect data, i.e., if the sound data is not stored in the input data region, the sound data corresponding to the sound file name stored in the input data region is read out from the sound file 14 (Step S20). The readout sound data is output to the sound converting unit 10. The sound data is converted to a sound, which is output through the loud speaker 11 (Step S21). Then, the process returns to Step S11.

The process of the above Steps S13 to S21 is repeated with respect to all the cells in the table data to output the cell data to the respective cells. Then, if it is determined in Step S12 that there is no cell in the table data region, the table data output process is ended.

The table data output process as described above is repeatedly executed, so that prestored numerical, character, image and sound data are read in accordance with the cell types (numerical, character, image or sound) set for the respective cells forming the table data, and displayed on the display unit or output as a sound.

Figure 7:
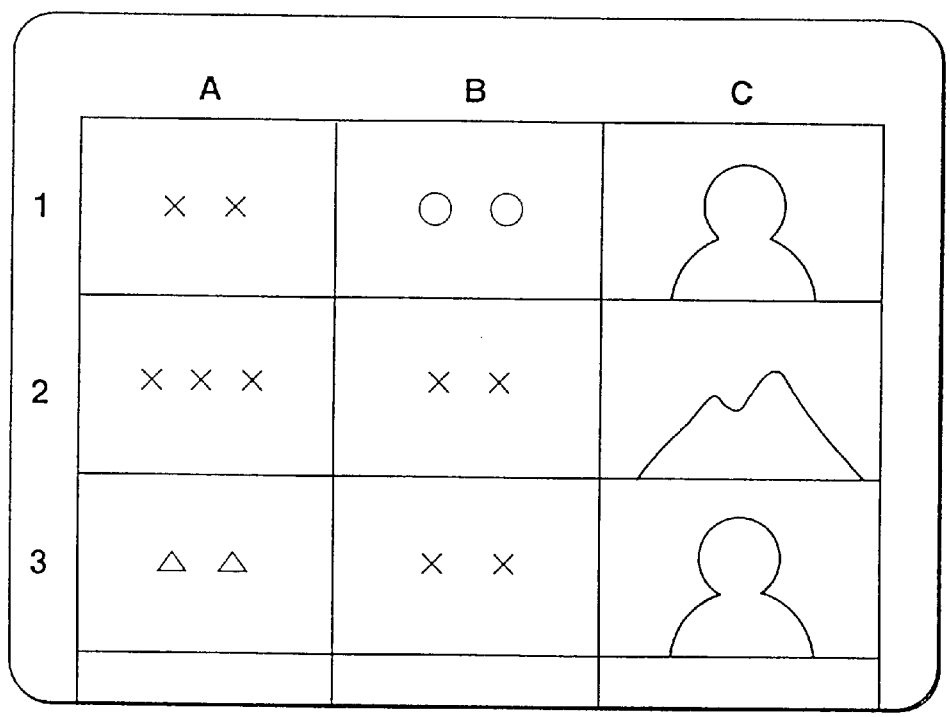
FIG. 7 is a diagram showing an example of display data displayed on the display by the table data output process shown in FIG. 6.

FIG. 7 shows an example of display data displayed on the display unit 12 through the table data output process. In FIG. 7, numerical or character data are displayed in cell coordinates A1 to A3 and B1 to B3 and image data are displayed in cell coordinates C1 to C3.

Thus, with the table processing function incorporated in the computer system 1 of the first embodiment, image data and sound data, as well as numerical and character data, can be processed as cell data of table data. Therefore, operations and procedures for treating image data and sound data in table processing can be simpler as compared to the conventional art. In addition, the manner of expressing cell data can be more diversified, thereby improving the table processing function and increasing the convenience.

In the first embodiment described above, image data or sound data are displayed or output as a sound in the output region of the designated cell position. However, animation data can be displayed as cell data, if it is prestored in the image file 13.

Moreover, image data, sound data and animation data can be processed not only individually but can be combined with one another, so that the combination of these data can be displayed or output as a sound. Thus, the manner of expressing cell data can be much more diversified.

Second Embodiment

A second embodiment of the present invention will be described with reference to FIGS. 8 to 11.

Since the block structure of the computer system of this embodiment is the same as that of the computer system 1 of the first embodiment, a drawing of the structure and a description of the functions thereof are omitted.

Figure 8:
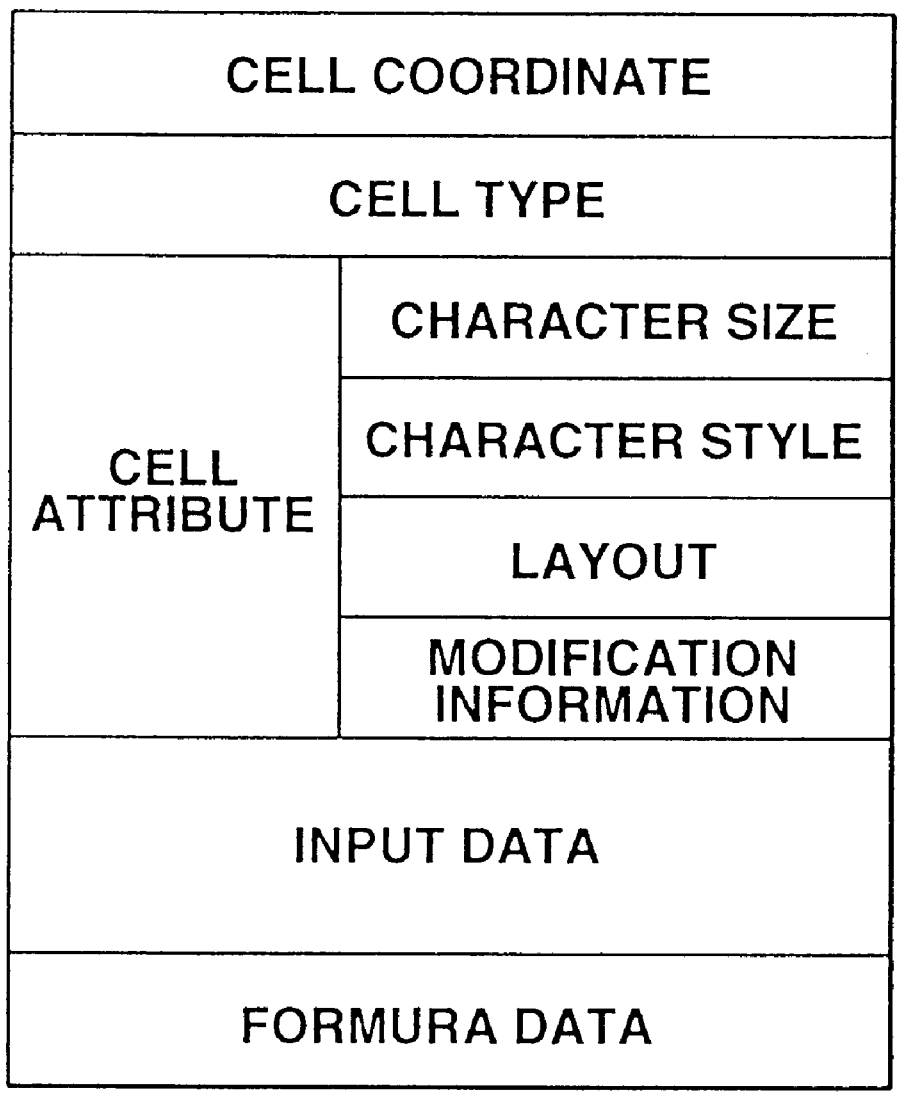
FIG. 8 is a diagram showing a data structure of cell data processed by a computer system according to a second embodiment of the present invention.

FIG. 8 is a diagram showing a data structure of cell data stored in the table data file 7 of the computer system 1 shown in FIG. 1.

Referring to FIG. 8, the cell data is constructed by regions for storing cell position coordinate data (two dimensional coordinates (X, Y)) representing the position of a cell in the table; cell type data representing the type of cell data (e.g., 0: numerical data, 1: character data, 2: image data, 3: sound data, 4: animation data); cell attribute data; input data, i.e., input numerical, character, image, or sound data; and formula data for indicating how to synthesize numerical, image and sound data. The cell attribute data include character size data (e.g., 0: 8 point, 1: 10 point), character style data (e.g., 0: Ming-style, 1: Gothic style), layout data (e.g., 0: left-justification, 1: centering, 2: right-justification), and modification information (0: standard, 1: inverted, 2: mirroring, 3: enclosure). FIGS. 9A to 9C show examples of images based on the modification information.

FIG. 9A shows a case in which the modification information is set to "1: inverted", so that the image is displayed invertedly. FIG. 9B shows a case in which the modification information is set to "2: mirroring", so that the image is displayed as a mirror image (symmetrically). FIG. 9C shows a case in which the modification information is set to "3: enclosure", so that the image is displayed with an enclosure (emphasized with a frame).

The formula data shown in FIG. 8 represents a content of synthesized data of image data or sound data with a simple formula. For example, the operator "+" means a bit OR process of images to be synthesized and successive generation of the sound of a left-side cell and that of a right-side cell. The operator "*" means a bit AND process of images to be synthesized.

An operation of the second embodiment will now be described.

Figure 10:
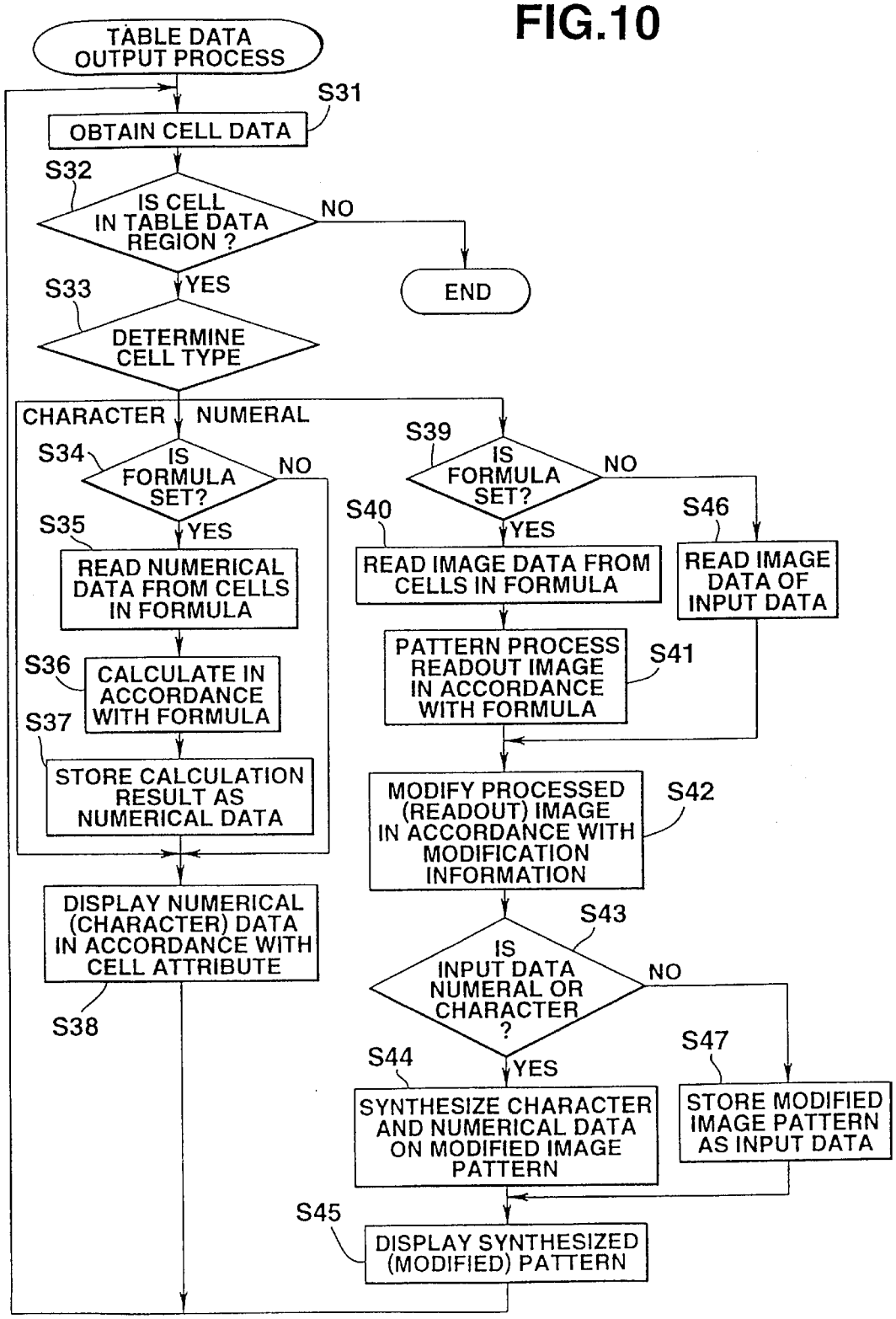
FIG. 10 is a flowchart showing a table data output process executed by the computer system of the second embodiment.

A table data output process executed by the computer system of the second embodiment will be described with reference to the flowchart shown in FIG. 10.

First, when the name of a file of the table data displayed on the display unit 12 is designated by a predetermined operation of the input unit 3 or the mouse 4, the table data corresponding to the designated file name is retrieved from the table data file 7. Cell data of each of the cells constituting the retrieved table data is obtained (Step S31). Then, it is determined, with reference to the cell position coordinates of the obtained cell data, whether the cell is included in a preset table data cell region (Step S32).

As a result of the determination, if the cell is not included in the table data cell region, the process is ended. If the cell is included in the table data cell region, the type of the data stored in the input data region of the cell data is discriminated (whether the data is of numerical or character, image, or sound type), with reference to the cell type data set in the cell data (Step S33). If the cell type is discriminated as character, the process advances to Step S38, in which the character data stored in the input data region of the cell is read out and displayed on the output region of the designated cell in accordance with the items set in the cell attribute (the character size, the character style, the layout and the modification information). Then, the process returns to Step S31.

If the cell type is discriminated as numerical, it is determined whether formula data is set in the designated cell (Step S34). If formula data is not set in the cell, the process advances to Step S38, in which the numerical data stored in the input data region of the cell is read out and displayed on the output region of the designated cell in accordance with the items set in the cell attribute (the character size, the character style, the layout and the modification information). Then, the process returns to Step S31.

If formula data is set in the designated cell, the numerical data in the respective cells contained in the formula is read out (Step S35), calculation of the numerical data of the respective cells is performed in accordance with the formula (Step S36), and the result obtained by the calculation is stored in the input data region of the corresponding cell as numerical data (Step S37). The numerical data stored in the input data region is read out and displayed on the output region of the designated cell in accordance with the items set in the cell attribute (the character size, the character style, the layout and the modification information). Then, the process returns to Step S31.

If the cell type is discriminated as the image type in Step S33, it is determined whether formula data is set in the designated cell (Step S39). On the other hand, if formula data is not set in the cell, the process advances to Step 46, in which the image data stored in the input data region is read out into the processing work memory 6. Then, the readout image data is subjected to a modification process in accordance with the modification information set in the cell attribute of the cell, and a modified image pattern is stored in the processing work memory 6 (Step S42).

Subsequently, it is checked whether numerical or character data is stored in the input data region (Step S43). If numerical or character data is not stored in the input data region, the process advances to Step S47, in which the modified image pattern is read from the processing work memory 6 and stored in the data input region of the cell as input data. The modified image stored in the input data region is read out and displayed on the output region of the cell (Step S45). Then, the process returns to Step S31.

If numerical or character data is stored, numerical or character data are synthesized on the modified image pattern, and the synthesized data is stored in the input data region of the cell as input data (Step S44). The synthesized data stored in the input data region is read out and displayed on the output region of the cell (Step S45). Then, the process returns to Step S31.

If formula data is set in the designated cell in Step S39, the image data in the respective cells contained in the formula are read out (Step S40), and the image data of the cells are pattern-processed (Step S41). Subsequently, the processed image is subjected to a modification process in accordance with the modification information set in the cell attribute of the cell and a modified image pattern is stored in the processing work memory 6 (Step S42). Then, it is checked whether numerical or character data is stored in the input data region of the cell (Step S43).

If numerical or character data is not stored, the process advances to Step S47, in which the modified image pattern is stored in the input data region of the cell as input data. The modified image is read from the input data region and displayed in the output region of the cell (Step S45). Then, the process returns to Step S31.

An example of the image data synthesizing process using a formula will be described with reference to table data shown in FIG. 11.

Figure 11:
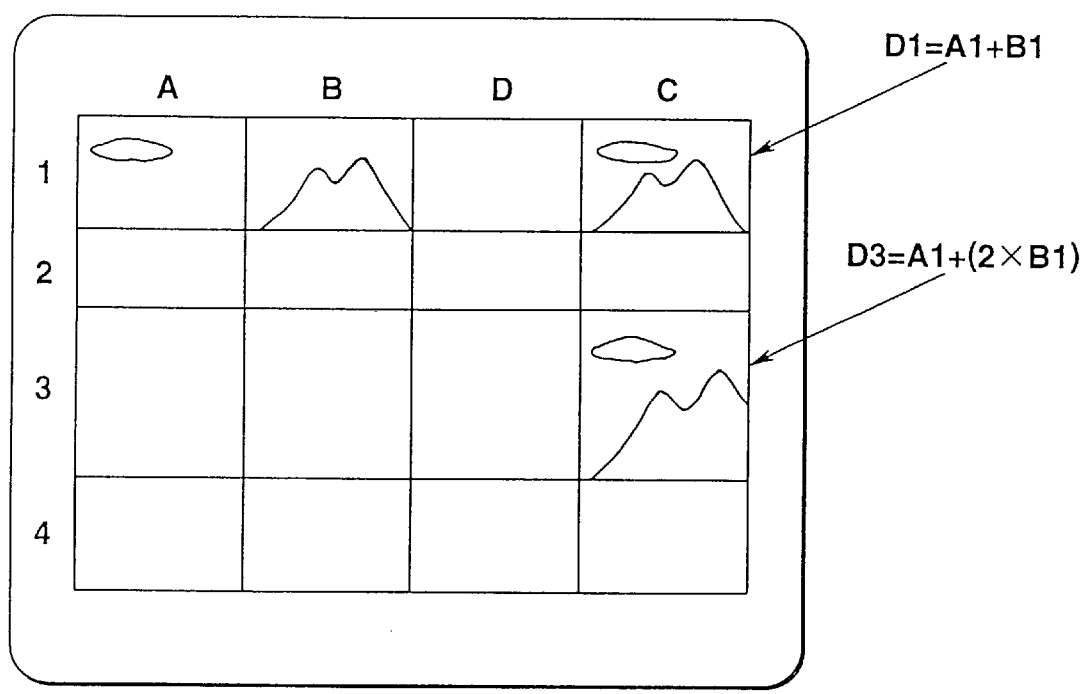
FIG. 11 is a diagram showing an example of display data displayed on the display by the table data output process shown in FIG. 10.

In the example of table data shown in FIG. 11, image data are respectively displayed in cell coordinates A1 and B1. If the formula "D1=A1+B1" as shown in FIG. 11 is set using the cell coordinates A1 and B1 as variables, the images of the cell coordinates A1 and B1 are added together and synthesized, and a synthesized image is displayed in cell coordinates D1.

If the formula "D3=A1+(2×B1)" is set as shown in FIG. 11, the image of the cell coordinates A1 is added to (synthesized with) a twice-enlarged B1 image, and the synthesized image is displayed in cell coordinates D3.

The following are examples of the cases where other formulas are set. If the formula "D3=A1×(−2)" is set, a ½ A1 image is displayed in cell coordinates D3. If the formula "D3=A1+10" is set, a 10-dot right-shifted A1 image is displayed in cell coordinates D3. If the formula "D3=A1−10" is set, a 10-dot left-shifted A1 image is displayed in cell coordinates D3. If the formula "D3=INV(A1)" is set, a pattern-inverted A1 image is displayed in cell coordinates D3.

Sound data in cells can also be synthesized using a formula in the same manner.

The table data output process as described above is repeatedly executed, so that prestored numerical, character, image and sound cell data are read in accordance with the cell types (numerical, character, image or sound) set for the respective cells constituting the table data, and displayed or output as a sound. Further, image data and sound data are synthesized in various patterns based on modification information in the cell attribute data set in the cell data or formula data, and displayed or output as a sound.

Thus, with the table processing function incorporated in the computer system of the second embodiment, image data and sound data, as well as numerical and character data, can be processed as cell data of table data, and various synthetic patterns of the cell data can be set and presented. Therefore, operations and procedures for treating image data and sound data in table processing can be simpler as compared to the conventional art. In addition, the manner of expressing cell data can be more diversified, thereby improving the table processing function and increasing the convenience.

In the second embodiment described above, image data or sound data, or synthesized data thereof, are displayed or output as a sound in the output region of the designated cell position. However, animation data can be synthesized and displayed as cell data, if it is prestored in the image file 13.

In the first and second embodiments, image data is output as display data in table data displayed on the display unit 12. However, image data can be output as print data through the printer unit 9.

Further, in the above embodiments, the various control programs, the table data output processing program and the image definition processing program are stored in the ROM 5 shown in FIG. 1. However, these programs can be stored in another memory device which has a memory medium in which programs and data are prestored. The memory medium is formed of a magnetic or optical memory medium or a semiconductor memory. The memory medium may be fixed to the memory device or detachably attached thereto. The programs or data may be supplied to and stored in the memory medium from another device connected to the memory device through a communication line or the like. The other device connected to the memory device through the communication line may comprise a memory device including a memory medium, so that programs and data stored in the memory medium can be used by the apparatus of the present invention through the communication line. The memory medium stores, in the form of program codes which the CPU can read, programs for achieving the functions indicated in the flowcharts shown in FIGS. 3, 6 and 10 illustrating the operations of the first and second embodiments of the present invention.

What is claimed is:

1. A table processing apparatus for processing table data arranged in a table having a plurality of cells, said apparatus comprising:

first storing means for storing image data with image file names;

second storing means for successively storing data input so as to respectively correspond to cells;

designating means for designating image definition data including an image file name to a designated cell in which image data is to be output;

first reading means for reading from the first storing means the image data having the image file name designated by the designating means;

writing means for writing the image data read by the first reading means along with the image definition data into a storage region of the second storing means which corresponds to the designated cell;

first discriminating means for, every time a cell in the table is designated, discriminating a data content in the second storing means which corresponds to the designated cell;

second reading means for reading image data along with image definition data, when the first discriminating means discriminate that the data in the designated cell is image data and the image data is stored in the second storing means;

image editing means for editing the read image data based on the image definition data read along with the image data;

first outputting means for outputting data edited by the image editing means to an output region of the designated cell; and third reading means for reading image data from the first storing means with the file name stored in the second storing means as the image definition data corresponding to the designated cell, when the first discriminating means discriminate that the designated cell is an image cell and image data is not stored in the storage region of the second storing means which corresponds to the designated cell.

2. A table processing apparatus for processing table data arranged in a table having a plurality of cells, said apparatus comprising:

first storing means for storing image data with image file names;

second storing means for successively storing data input so as to respectively correspond to cells;

designating means for designating image definition data including an image file name to a designated cell in which image data is to be output;

first reading means for reading from the first storing means the image data having the image file name designated by the designating means;

writing means for writing the image data read by the first reading means along with the image definition data into a storage region of the second storing means which corresponds to the designated cell;

first discriminating means for, every time a cell in the table is designated, discriminating a data content in the second storing means which corresponds to the designated cell;

second reading means for reading image data along with image definition data, when the first discriminating means discriminate that the data in the designated cell is image data and the image data is stored in the second storing means;

image editing means for editing the read image data based on the image definition data read along with the image data;

first outputting means for outputting data edited by the image editing means to an output region of the designated cell;

second discriminating means for discriminating whether image modifying data is added to data corresponding to the designated cell in the second storing means;

image modifying means for, when the second discriminating means discriminates that image modifying data is added to the data of the designated cell, image-modifying the image data edited by the image editing means based on the image modifying data; and second outputting means for outputting the image data modified by the image modifying means to the output region of the designated cell.

3. A table data processing apparatus for displaying a table data sheet in which a plurality of cells are arranged in a table form in vertical and horizontal directions, comprising:

cell data storage means for storing, for each cell included in the table data sheet, cell data including a coordinate position on the table data sheet, a data type, and real data of each cell;

image file storage means for storing a file in which image data is stored;

determining means for, when the table data sheet is displayed, obtaining cell data in each cell included in the table data sheet from the cell data storage means, and for determining, for each cell data, whether the data type of the cell data is a numeric/character type or an image type;

first cell display control means for, when the determining means determines that the data type is the numeric/character type, displaying the real data of the cell in a cell display area corresponding to the cell data in the table data sheet; and second cell display control means for, when the determining means determines that the data type is the image type, displaying, in the cell display area corresponding to the cell data in the table data sheet, a display image comprised of one of image data stored as the real data of the cell and image data stored in the image file read out from the image file storage means.

4. The apparatus according to claim 3, wherein the cell data whose data type is the image type further includes image editing data including an image output scale factor and image rotation data; and the second cell display control means includes means for displaying a display image subjected to one of scaling and image rotation in accordance with the image editing data, when the display image based on the image data is to be displayed in the cell display area.

5. The apparatus according to claim 3, wherein the cell data whose data type is the image type includes image modification data including image inversion data and mirrored image data; and the second cell display control means displays a display image in which image modification is performed on an original image in accordance with the image modification data when the display image based on the image data is to be displayed in the cell display area.

6. A table data processing apparatus for displaying a table data sheet in which a plurality of cells are arranged in a table form in vertical and horizontal directions, comprising:

cell data storage means for storing, for each cell included in the table data sheet, cell data including at least a coordinate position on the table data sheet, and output data to be outputted in the cell;

image file storage means for storing a file in which image data is stored;

setting means for arbitrary setting a correspondence of the image data of the image file stored in the image file storage means with a cell arbitrarily designated from among the plurality of cells included in the table data sheet;

cell data update means for updating the cell data by storing, in the cell data corresponding to the designated cell, the set image data or image read data for reading the image file, in accordance with the set correspondence of the image data set by the setting means; and cell display control means for, when the table data sheet is displayed, obtaining cell data of each cell included in the table data sheet from the cell data storage means, and for, when the image data or the image read data is stored in the cell data, displaying, in the cell area corresponding to the cell data in the table data sheet, a display image comprised of one of image data in the cell data and image data stored in the image file read out from the image file storage means with the image read data.

7. A table data processing apparatus for displaying a table data sheet in which a plurality of cells are arranged in a table form in vertical and horizontal directions, comprising:

cell data storage means for, with respect to each cell included in the table data sheet storing cell data including at least coordinate data of each cell on the table data sheet and output data to be outputted in the cell;

file storage means for storing one of an image file having image data and an audio file having audio data is stored;

setting means for arbitrarily setting the image file or the audio file stored in the file storage means with a cell arbitrarily designated from among the plurality of cells included in the table data sheet;

cell data update means for updating the cell data by storing, in the cell data corresponding to the designated cell, file read data for reading the set image file or audio file; and cell control means for obtaining the cell data of the designated cell from the cell data storage means with respect to a cell designation in the table data sheet, for reading a corresponding file from the file storage means in accordance with the cell read data when the file read data is stored in the cell data, and for displaying a display image in a cell display area comprised of image data stored in the read out image file or for outputting audio data stored in the read out audio file.

8. An article of manufacture comprising a computer usable medium having a computer program encoded thereon for causing a table data sheet to be displayed in which a plurality of cells are arranged in a table form in vertical and horizontal directions, said computer program comprising:

computer readable program code means for causing a computer to store, in each cell included in the table data sheet, cell data including a coordinate position on the table data sheet, a data type, and real data of each cell;

computer readable program code means for causing the computer to store a file in which image data is stored;

computer readable program code means for causing the computer to obtain, when the table data sheet is displayed, cell data in each cell included in the table data sheet, and to determine, for each cell data, whether a data type of the cell data is a numeric/character type or an image type;

computer readable program code means for, when the computer determines that the data type is the numeric/character type, causing the computer to display the real data of the cell data in a cell display area corresponding to the cell data in the table data sheet; and computer readable program code means for, when the computer determines that the data type is the image type, causing the computer to display, in the cell display area corresponding to the cell data in the table data sheet, a display image comprised of image data in a read out image file.

9. An article of manufacture comprising a computer usable medium having a computer program encoded thereon for causing a table data sheet to be displayed in which a plurality of cells are arranged in a table form in vertical and horizontal directions, said computer program comprising:

computer readable program code means for causing a computer to store, for each cell included in the table data sheet, cell data including at least a coordinate position on the table data sheet, and output data to be outputted in the cell;

computer readable program code means for causing the computer to store a file in which image data is stored;

computer readable program code means for causing the computer to arbitrarily set a correspondence of the image data of the stored image file with a cell arbitrarily designated from among the plurality of cells included in the table data sheet;

computer readable program code means for causing the computer to update the cell data by storing, in the cell data corresponding to the designated cell, the set image data or image read data for reading the image file, in accordance with the set correspondence of the image data; and computer readable program code means for, when the table data sheet is displayed, causing the computer to obtain cell data of each cell included in the table data sheet, and for, when the image data or the image read data is stored in the cell data, causing the computer to display, in the cell area corresponding to the cell data in the table data sheet, a display image comprised of one of image data in the cell data and the image data stored in the image file read out with the image read data.

10. An article of manufacture comprising a computer usable medium having a computer program encoded thereon for causing a table data sheet to be displayed in which a plurality of cells are arranged in a table form in vertical and horizontal directions, said computer program comprising:

computer readable program code means for causing a computer to store, for each cell included in a table data sheet, cell data including at least coordinate data of each cell on the table data sheet and output data to be outputted in the cell;

computer readable program code means for causing the computer to store one of an image file image data and an audio file having audio data;

computer readable program code means for causing the computer to arbitrarily set the image file or the audio file with a cell arbitrarily designated from among the plurality of cells included in the table data sheet;

computer readable program code means for causing the computer to update the cell data by storing, in the cell data corresponding to the designated cell, file read data for reading the set image file or audio file; and computer readable program code means for causing the computer to obtain the cell data of the designated cell with respect to a cell designation in the table data sheet, for causing the computer to read a corresponding file in accordance with the cell read data when the file read data is stored in the cell data, and for causing the computer to display an image in a cell display area comprised of image data stored in the read out image file or to output audio data stored in the read out audio file.

\* \* \* \* \*

UNITED STATES PATENT AND TRADEMARK OFFICE
CERTIFICATE OF CORRECTION

PATENT NO. : 6,055,549
DATED : April 25, 2000
INVENTOR(S) : Katsuji Takano

It is certified that error appears in the above-identified patent and that said Letters Patent is hereby corrected as shown below:

<u>Title page, Item [54] and Column 1, lines 1 & 2,</u>
Change "METHOD AND APPARATUS FOR PROCESING A TABLE" to
-- METHOD AND APPARATUS FOR PROCESSING A TABLE AND DISPLAYING MULTIMEDIA CELL DATA --.

Signed and Sealed this

Twenty-first Day of January, 2003

JAMES E. ROGAN
*Director of the United States Patent and Trademark Office*